(12) United States Patent
Prehofer

(10) Patent No.: US 7,444,149 B2
(45) Date of Patent: Oct. 28, 2008

(54) PROACTIVE DEPLOYMENT OF DECISION MECHANISMS FOR OPTIMAL HANDOVER

(75) Inventor: Christian Prehofer, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 10/517,970

(22) PCT Filed: Jun. 13, 2002

(86) PCT No.: PCT/EP02/06508

§ 371 (c)(1), (2), (4) Date: Sep. 26, 2005

(87) PCT Pub. No.: WO03/107704

PCT Pub. Date: Dec. 24, 2003

(65) Prior Publication Data
US 2006/0099952 A1    May 11, 2006

(51) Int. Cl.
*H04Q 7/20* (2006.01)
(52) U.S. Cl. ...................... 455/436; 455/440
(58) Field of Classification Search ............... 455/437, 455/436, 439, 443, 122.1, 435.1, 422.1
See application file for complete search history.

(56) References Cited

U.S. PATENT DOCUMENTS

| | | | |
|---|---|---|---|
| 6,097,953 A * | 8/2000 | Bonta et al. .................. | 455/436 |
| 6,285,883 B1 * | 9/2001 | Bringby et al. .............. | 455/437 |
| 6,711,408 B1 * | 3/2004 | Raith .......................... | 455/440 |
| 2001/0005683 A1 | 6/2001 | Zicker et al. | |
| 2002/0168980 A1 * | 11/2002 | Gwon et al. ................. | 455/437 |

FOREIGN PATENT DOCUMENTS

| | | |
|---|---|---|
| CN | 1175179 | 3/1998 |
| EP | 0 802 694 A2 | 10/1997 |
| JP | 10-94020 | 4/1998 |
| JP | 2000-184438 | 6/2000 |
| WO | WO 00/67514 | 11/2000 |
| WO | WO 01/58182 A2 | 8/2001 |

OTHER PUBLICATIONS

Written Opinion dated Mar. 16, 2004.
International Preliminary Examination Report dated Oct. 18, 2004.
International Search Report dated Dec. 3, 2002.
Konstantinos Psouins, "*Active Networks: Applications, Security, Safety, and Architectures*," IEEE Communications Surveys, pp. 2-16 (1999), no month listed.

(Continued)

*Primary Examiner*—Melody Mehrpour
(74) *Attorney, Agent, or Firm*—Edwards Angell Palmer & Dodge LLP; John J. Penny, Jr.

(57) ABSTRACT

To achieve optimal selection of new access points for mobile devices (10) being located in a mobile communication environment (14), according to the present invention there is provided a method of assisting handovers for a mobile device in a mobile communication environment. It is proposed to proactively deploy a handover decision mechanism in relation to a handover and in view of the operational context of the mobile device (10). This proactively deployed handover decision mechanism is then used to determine a new access point for the mobile device (10).

38 Claims, 15 Drawing Sheets

OTHER PUBLICATIONS

Wang, et al., *"Policy-Enabled Handoffs Across Heterogeneous Wireless Networks,"* pp. 1-10, no date listed.
Kounavis, et al., *"Design, Implementation and Evaluation of Programmable Handoff in Mobile Networks,"* Mobile Networks and Applications, 6:443-461 (2001), no month listed.
Chinese Office Action dated Sep. 22, 2006.
Chinese Office Action dated Sep. 22, 2006 (with partial translation).
Japanese Office Action dated Jan. 15, 2008.

* cited by examiner

Handover Criteria Table

| | AP1 | AP2 | AP3 | AP4 |
|---|---|---|---|---|
| Signal strength $\geq TS$ | Y | N | Y | N |
| Bandwidth $\geq TB$ | Y | N | Y | N |
| Movement Prediction | P1 low | P2 low | P3 high | P4 high |
| Result | Un-deploy (optional) | Un-deploy (optional) | Handover | Pro-active deployment |

PROACTIVE DEPLOYMENT OF DECISION MECHANISMS FOR OPTIMAL HANDOVER

FIELD OF INVENTION

The present invention relates to the establishment of decision mechanisms for handover, and in particular to a proactive deployment of decision mechanisms for optimal handover.

BACKGROUND ART

Handover is the process of automatically transferring a connection in progress between a mobile device and one cell of a mobile communication environment to another cell as a consequence of the mobility of the mobile device or, in other words, as a consequence of user movements. This process generally requires some detection of the necessity of the handover and then the switching of the transaction from a cell of the mobile communication environment to another cell while keeping user disturbance to a minimum.

In the following, without imposing a restriction on the type of mobile communication environment—i.e., cellular mobile telephone network, wireless LAN, PDC—it is assumed that the coverage area of the mobile communication environment divides into a plurality of cells. It is also assumed that communication between a mobile device located in the mobile communication environment, in particular a specific cell thereof, and the mobile communication environment is supported through at least one access point in each cell.

Typically, the mobile device will traverse different cells in the mobile communication environment when roaming therein. Here, the problem is to decide which access point to choose. State of the art are many algorithms based on signal strength analysis or on available radio resources in view of a location of the mobile device and surrounding access points. Even if one access point is slightly better regarding these local measurements, the decision may not be the best. E.g., one might consider a situation where a mobile device is located in a train. In such a case it is obviously better to hand over to an access point situated nearly to the train track, even if another access point is better reachable for a short period of time.

Therefore, in may cases the handover can be optimized by considering the mobile device movement and user preferences. E.g., if the mobile device is located in a car or train, its route may be constrained to certain cells and related access points in the mobile communication environment. Further, the mobile device profile may contain information that the mobile device is built into a car. Alternatively, the movement pattern of the mobile device suggests that the user is travelling in a train.

However, a main problem not considered so far in the state of the art is that handover decisions have to be executed fast. Nevertheless, the mobile device profile and location information is only available on a central server in the mobile communication environment. Therefore, retrieving this information may be too slow for achieving optimal handover decisions. Even worse, in some cases the radio conditions during handover may be so poor that they even prohibit exchange of such information.

SUMMARY OF INVENTION

In view of the above, the object of the present invention is to provide for mechanisms to achieve optimal selection of new access points for mobile devices located/roaming in a mobile communication environment.

According to the present invention, this object is achieved through a method of assisting at least one handover for a mobile device in a mobile communication environment which has a plurality of access points having the features of claim 1.

According to the present invention operational context may be understood as operational context being available at the time of handover decision mechanism set-up—e.g., user profile—and/or dynamic operational context derived from dynamic operational conditions before or at the time of handover. The combination of the context being available at the time of handover decision mechanism set-up with the proactively deployed handover decision mechanism allows for set up of a handover decision framework.

An important advantage of the inventive method is proactivity. Therefore, handover decision mechanisms are installed prior to a handover decision to be taken. This productivity avoids a situation where decision-relevant information and mechanisms are not available at a point in time when a handover decision has to be taken. In other words, the inventive method of assisting at least one handover avoids bottlenecks due to transmission delay or low transmission bandwidth.

Another important advantage of the inventive method is that the handover decision mechanism is provided in relation to the operational context of the mobile device. In other words, the invention provides for a dynamic mechanism in establishing handover decisions according to operative conditions of the mobile device which change over time. Contrary to a statical process, this dynamic deployment of handover decision mechanism is a prerequisite for optimization of the handover decision in view of both, not only the operative condition of the mobile device but also the operative condition of the mobile communication environment.

Another important advantage of the inventive method is that it is not restricted to a single handover decision but allows to take a plurality of handover decisions for a mobile device if the operational context is suitable for taking a plurality of handover decision mechanisms at one point in time. The overall benefit of this approach is that the traffic load in the mobile communication environment may be reduced as the amount of handover decision related information to be transmitted in the mobile communication environment is minimized.

Another important advantage of the inventive method of assisting at least one handover is that the proactive deployment can take place at any time while the terminal is within a location of an access point such as to transmit the handover decision mechanism.

Yet another important advantage of the inventive method of assisting at least one handover is that the proactive deployment is independent of the detailed mechanism which is used to determine the optimized access point for handover.

According to a preferred embodiment of the present invention, the operational context is related to a current position of the mobile device. Preferably, the operational context is derived by predicting a movement of the mobile device, e.g., through prediction of a movement path preferably in consideration of the movement speed of the mobile device. Typically, the prediction of a movement of the mobile device considers a current position of the mobile device as starting point.

This preferred embodiment of the present invention allows for a location dependent decision on handover. E.g., in one sub-area of the mobile communication environment with a high traffic load, it might be preferable to use a handover decision mechanism adapted to a hard handover to minimize further bandwidth consumption. To the contrary, in a different sub-area of the mobile communication environment with a low traffic load, it might be possible to deploy a handover decision mechanism being adapted to a soft handover requiring a transfer of data between the mobile device and a plurality of access points and thus a higher amount of available bandwidth.

Another important advantage of this preferred embodiment is that typically mobile devices will move in a mobile communication environment. Once the topology and speed of movement is available, the proactive deployment mechanism according to the present invention allows to avoid unfavorable handovers.

It is important to note that the avoidance of such wrong handovers significantly reduces signaling load on the mobile communication environment, which is of particular relevance in highly congested areas, e.g., metropolitan areas.

Further, the proactive deployment of handover decision mechanisms in view of moving topologies of users supports an effective extension of the mobile communication environment, such as the installation of additional access points along a train track or a highway route. It is the inventive proactive deployment mechanism which ensures that once such additional access points have been installed in the mobile communication environment, handover is actually achieved to the additional access point resources.

According to another preferred embodiment of the present invention, the operational context is determined as a profile of applications being executed in the mobile device. The profile of applications is determined before or at the time of proactive deployment of the handover mechanism. It should be noted that the determination of profile of applications as operational context may of course be combined with the previous determination of location and prediction of movement as operational context.

As basis for the determination of a profile of applications, one might classify applications into video, still image, audio, text, and speech, or alternatively interactive, point-to-point, one-way or multipoint, whatever is appropriate.

The consideration of a profile of applications as operational context has the important advantage that once a plurality of different access points are available to the handover decision mechanism, handover can be achieved to those access points that actually support the applications running on the mobile device. One typical example would be that a mobile device uses speech and data services so that a handover to an access point supporting speech only should be avoided. The overall benefit of the consideration of a profile of applications is that it enables the minimization of disturbance for subscribers during handover.

According to another preferred embodiment of the present invention, the operational context of the mobile device is determined as a profile of a user of the mobile device. Of course, this operational context may again be combined with the previously discussed operational context being related to location/movement and profile of applications.

An important advantage of the consideration of a profile of an user of a mobile device—or, in other words, a subscriber to the mobile communication environment—is that again incorrect and time- and resource-consuming unfavourable handovers may be avoided.

The reason heretofore is that the consideration of access rights of the user to specific services offered by the mobile communication environment—e.g., access to speech and data services—allows to avoid a handover to access points not being in compliance with such access rights.

It should be noted that the operational context being related to the profile of an user may be proactively deployed either into the mobile communication environment or onto the mobile device much earlier than the decision on a handover has to be taken, preferably during a time period with low traffic load to optimize resource utilization.

Further preferred embodiments of the present invention are related to the selection of candidate access points which are supplied as input to the handover decision mechanism.

According to a preferred embodiment, at least one candidate access point is identified using assisting, pre-installed handover mechanisms.

The advantage of this preferred embodiment is that the existing mobile communication environment infrastructure must be modified only to the minimum extent, i.e., through installation of the proactive deployment of handover decision mechanisms leaving all other aspects of network management unchanged. Here, one typical example of existing handover mechanisms would be those mechanisms relying on a signal strength measurements and selection of those access points leading to the highest level of signal strength for exchange of information between the mobile device and the access point.

According to another preferred embodiment of the present invention, candidate access points are ranked according to dynamic criteria. Examples of such criteria are, e.g., signal strength, bandwidth, supported applications, quality of service, network usage, power consumption.

An important advantage of this preferred embodiment is that the handover decision mechanism may not only be deployed proactively, but may also change over time in view of the existing operational context both for the mobile device and the mobile communication environment. This allows for an optimal adaptation to the type of mobile device used in the mobile communication environment and to the type of access points being available. E.g., for mobile computing devices like lap-top computers, power consumption, quality of service or available bandwidth for data communication and supported type of data traffic might be critical, while for pure speech-based applications, e.g., in a 2G mobile communication environment, available signal strength is more important to avoid interruption of services.

A further important advantage of the use of dynamic criteria is that evaluation of different criteria may be achieved in a very flexible way.

A first option is to simply have appropriate threshold values and then to take a yes/no decision in relation to each single criterion.

A second option is to avoid such a strict yes/no decision and to use a weighting function for the different criteria—e.g., a probability value for the chance that a predicted movement will actually be followed by the mobile device—which may then be combined in an overall value of merit for handover to a specific access point.

Further preferred embodiments of the present invention are related to the question where the handover decision mechanism is proactively deployed.

According to a first preferred embodiment, the handover decision mechanism is deployed in the mobile communication environment, preferably into a sub-system thereof, e.g., a base station.

This preferred embodiment is particularly related to so-called network-assisted handovers, where a handover is guided by access points. A particular advantage of this approach is that location information for the mobile device is usually available in a mobile communication environment and may therefore easily be downloaded together with the handover decision mechanism to the access point—or a local access point controller—without any extra effort.

A further advantage is that the proactive deployment of a handover decision mechanism within the mobile communication environment is particularly suited for soft handover, where the handover decision mechanism must be proactively deployed at a plurality of access points.

According to another preferred embodiment of the present invention, the handover decision mechanism is deployed in the mobile device.

A particular advantage of this preferred embodiment is that it is well suited for handover decision mechanisms which rely on an operational context derived from applications running in the mobile device. Here, the provision of related application profile information to the handover decision mechanism does not require any information exchange in the mobile communication environment and a related delay of handover decision.

According to a further preferred embodiment of the present invention, the handover decision mechanism may be proactively deployed both at access points of the mobile communication environment and in the mobile device.

This preferred embodiment of the present invention combines the advantages given above for proactive deployment either at the access points of the mobile communication network or in the mobile devices, i.e., suitability for soft handover with minimized information exchange for provision of application profiles or user profiles.

Further, this preferred embodiment allows to split handover decision related functionality between access points in the mobile communication environment and the mobile device such that signalling traffic to achieve handover decision and subsequent handover is minimized when functionality being related to the mobile communication environment is proactively deployed at the access points and functionality being related to handover at the mobile device is proactively deployed in the mobile device.

Further preferred embodiments are related to the mechanisms for proactively deploying the handover decision mechanism in the sense outlined above.

According to a first preferred embodiment, a handover decision mechanism is proactively deployed through transfer of code data achieving the handover decision functionality.

This preferred embodiment of the present invention is particularly suited for active networks that allow the programming of networks by injecting programs into it, according to the present invention code data adapted to achieve a handover decision mechanism. This code data results in a modification of the state and behaviour of the mobile communication environment with respect to the handover decisions taken therein.

According to another preferred embodiment, the handover decision mechanism is proactively deployed through transfer of criteria for at least one new access point, while it is assumed that the handover decision functionality processing the criteria is already pre-installed at appropriate access points or other networks nodes in the mobile communication environment or alternatively in the mobile device. This allows to minimize traffic load necessary for proactive deployment of the handover decision mechanism.

A further preferred embodiment of the present invention relates to an undeployment of the handover decision mechanism when it is no more relevant.

As already outlined previously, the proactive deployment of the handover decision mechanism aims at dynamically taking optimal handover decisions in view of specific operational contexts. In view of the fact that this operational context will continuously change over time, the undeployment of handover decision mechanism assures that never an outdated handover decision mechanism will be used to take a handover decision. Further, the undeployment of handover decision mechanism allows to minimize storage requirements, which is of particular relevance when the handover decision mechanism is proactively deployed in the mobile device having limited storage resources.

Similar advantages as outlined above with respect to the inventive method of assisting at least one handover for a mobile device in a mobile communication environment are also achieved by the inventive handover assisting apparatus for a mobile device in a mobile communication environment and will therefore not be repeated here.

A further preferred embodiment of the present invention is related to a computer program product directly loadable into the internal memory of a mobile communication unit comprising software code portions for performing the inventive process when the product is run on a processor of the mobile communication unit.

Therefore, the present invention is also provided to achieve an implementation of the inventive method steps on computer or processor systems. In conclusion, such implementation leads to the provision of computer program products for use with a computer system or more specifically a processor comprised in e.g., a network node in the mobile communication environment or the mobile device.

This programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and harddrives; or information convey to a computer/processor through communication media such as network and/or Internet and/or telephone networks via modems or other interface devices. It should be understood that such media, when carrying processor readable instructions implementing the inventive concept represent alternate embodiments of the present invention.

BRIEF DESCRIPTION OF DRAWINGS

In the following, the best mode of carrying out the present invention and related preferred embodiments will be described with respect to the drawings; in which:

FIG. 8 shows the proactive deployment of a handover decision mechanism through transfer of decision criteria in tabular form;

DESCRIPTION OF BEST MODE AND PREFERRED EMBODIMENTS

In the following, preferred embodiments of the present invention will be explained with reference to the drawings.

Figure 1:
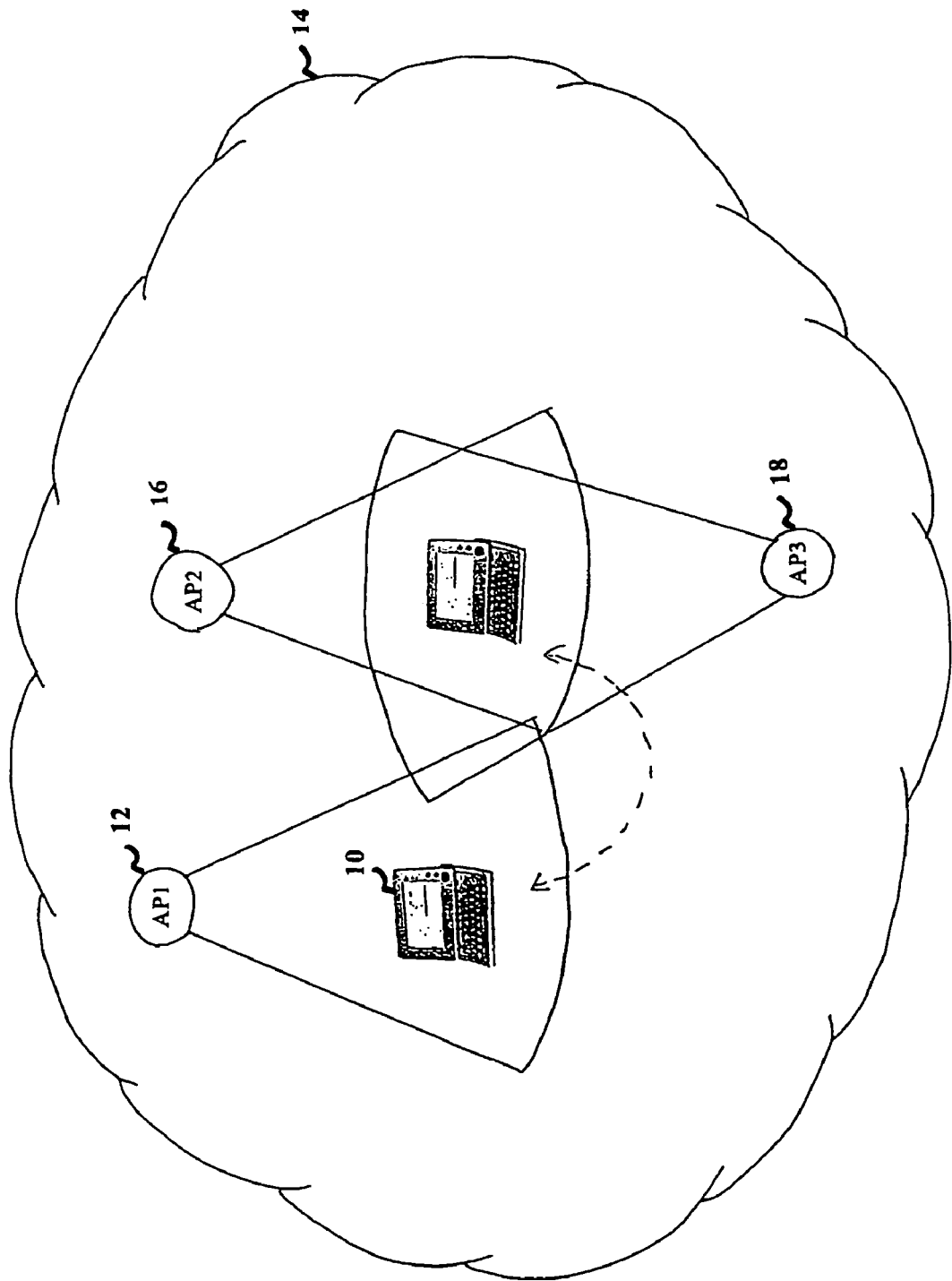
FIG. 1 shows a basic principle underlying the proactive deployment of a handover decision mechanism according to the present invention.

FIG. 1 shows a basic principle underlying the present invention. Generally, a handover of a mobile device divides into the preparation of a handover decision, the handover decision itself, and subsequent hereto the execution of the handover. The present invention aims at improving flexibility and efficiency of the steps preparing handover decision and executing handover decision, overcoming previously established static handover procedures.

In the following a proactive deployment of a handover decision mechanism, the concept of context determination, and efficient determination of handover candidate access points will be explained. Heretofore, basic principles of the present invention will be introduced in view of examples shown in FIG. 1 to 3. Then implementation issues will be discussed with respect to FIG. 4 to 13. Finally application scenarios for the present invention will be explained with respect to FIG. 14 to 16.

As shown in FIG. 1, a handover situation occurs when a mobile device 10 is located within the access area of an access point 12 of a mobile communication environment 14.

Additional access points 16 and 18 may surround the access point 12 and constitute candidate access points for handover of the mobile device 10.

For highly efficient preparation of handover according to the present invention it is proposed to proactively deploy a handover decision mechanism either onto the mobile terminal 10 or the access point 12 based on mobile device profile and movement patterns. As will be explained in more detail in the following, the handover decision mechanism may be a table listing criteria for a handover decision or a small program/function, which can be used to achieve the handover decision. Given a selection of possible access points 16, 18, the handover decision mechanism determines the best access point regarding predicted movement or usage preferences.

According to the present invention, the proactive deployment can take place at any time while the mobile device is within location of the access point 12, i.e. already before the time of handover decision.

Another important aspect of the present invention relates to the determination of information with respect to an operation context of the mobile device and the mobile communication environment. This operation context is a basis to feed the proactively deployed handover decision mechanism with information relevant for achievement of an optimal handover.

Typical examples for the determination of an operative context are the detection of a current movement pattern of the mobile device, e.g., by knowledge of train or road routes, by knowledge of a user profile, e.g., if a user travels a way repeatedly. Further examples are a user profile, where the mobile device is fixed in a car or a train, a group profile, where a user travels with a group from which is known that it travels, e.g., on a specific train route.

Yet another important aspect of the present invention again being related to an efficient preparation of a pro-actively deployed handover decision is the determination of candidate access points.

An example heretofore, e.g., when the handover is imminent, is that the mobile device uses existing mechanisms, e.g., signal strength available through access points 16, 18, to determine possible access points as candidate access points. Preferably, candidate access points can be ranked using dynamic criteria and operative context information.

Besides the operative context also the determined group of candidate access points is taken as input to the proactively deployed handover mechanism for computation of the best next access point.

Finally, handover is executed to the new access point, e.g., access point 16. Preferably, the proactively deployed handover decision mechanism is un-deployed or equivalently deleted and the procedure according to the present invention is repeated at the new access point 16.

It should be noted that the inventive proactive deployment procedure is independent of the type of mobile communication network and mobile device. Typically, the mobile communication environment may be operated according to a standard, e.g., selected from a group comprising GSM, TDC, GPRS, PPP, HSCST, WLAN, HiperLAN, IrDa, Bluetooth, IS45, IS95, IMT2000. The mobile device may any type of mobile unit, e.g., a telephone, a personal digital agent, a portable computer or any hybrid thereof.

Figure 2:
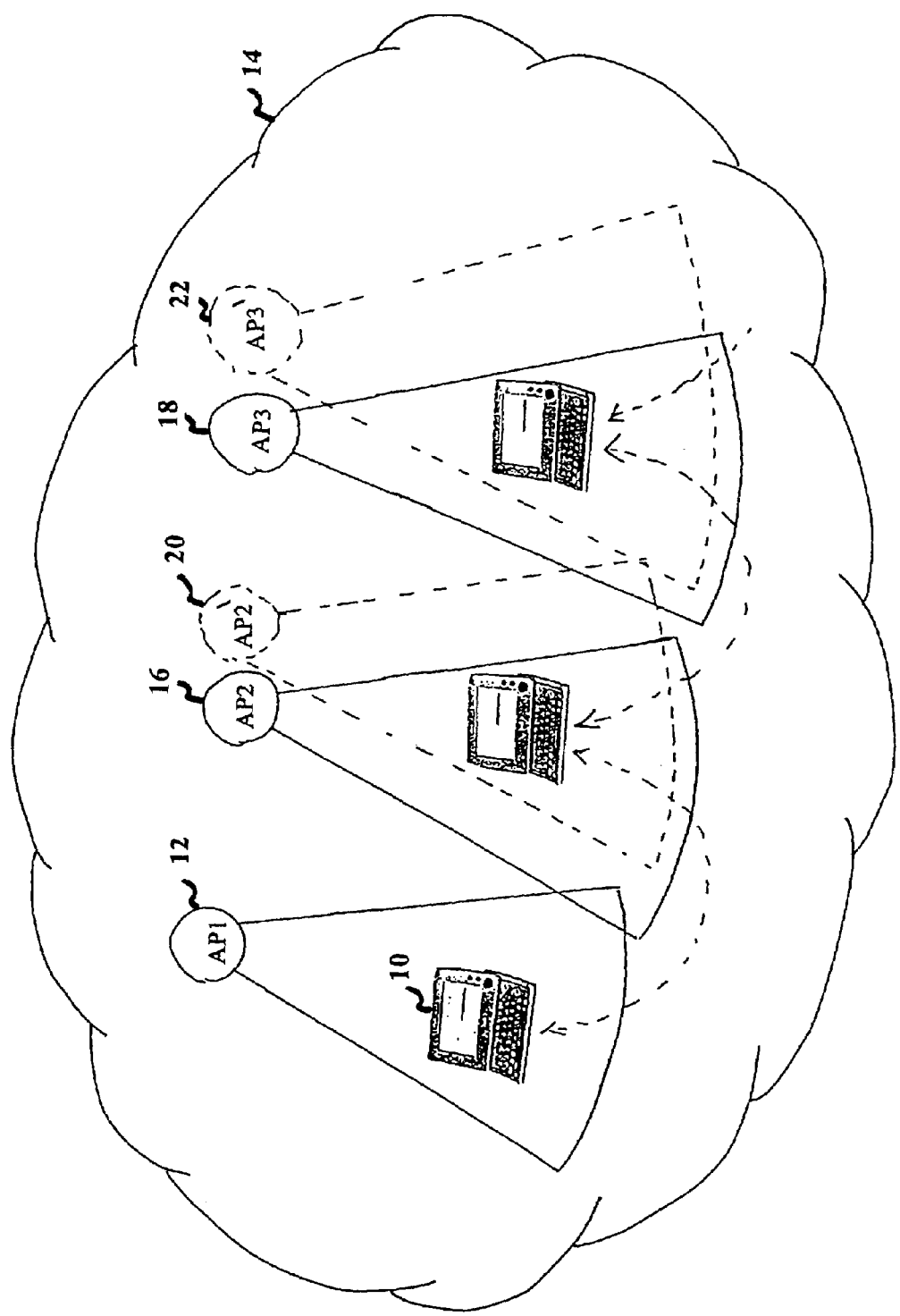
FIG. 2 shows further principles underlying the proactive deployment of the handover decision mechanism according to the present invention.

FIG. 2 shows principles underlying the proactive deployment of the handover decision mechanism in case access points offer different services. Elements being identical to those previously discussed with respect to FIG. 1 are denoted using the same reference numerals.

The proactive deployment of the handover decision mechanism illustrated in FIG. 2 relates to a case where different candidate access points offer different services, e.g., speech, audio, video, text, etc. Further to the access candidates points 16, 18 shown in FIG. 1, it is assumed that additional candidate access points 20, 22 offering services different from the candidate access points 16, 18 exist as input candidate access points to the proactively deployed handover decision mechanism.

To execute the handover decision, the handover decision mechanism will use information about the usage profile for applications running on the mobile device to find the optimal new access point. E.g., when the user uses data services to a large extent, an access point being related to a packet data transmission, e.g., WLAN would be preferred.

Figure 3:
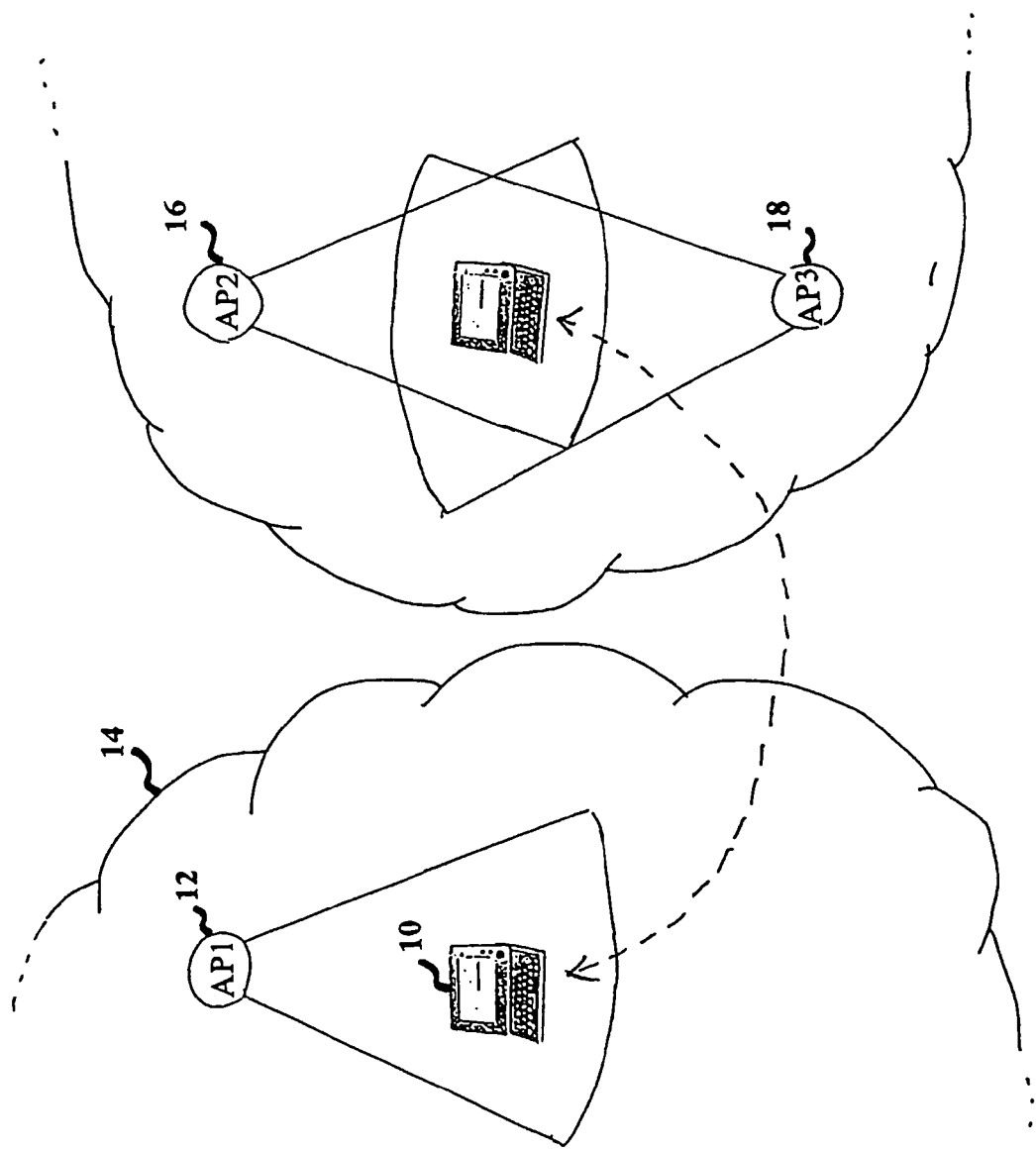
FIG. 3 shows the application of the proactive deployment of a handover decision mechanism to an internetwork-related handover.

FIG. 3 shows another example of the proactive deployment of a handover decision mechanism according to the present invention. Those elements being previously discussed with respect to FIGS. 1 and 2 are again denoted using the same reference numerals.

As shown in FIG. 3, proactive deployment of the handover decision mechanism may also be applied to handover scenarios crossing network boundaries, either between different mobile communication environments or between sub-networks in the mobile communication environment.

As shown in FIG. 3, the proactive deployment of the handover decision mechanism may equally be applied to a handover between different mobile communication environments as long as exchange of handover-related information between these different environments is established.

In the following, a more detailed explanation of the inventive proactive deployment of a handover decision mechanism and a related apparatus will be explained with reference to FIGS. 4 to 10.

As outlined above, the inventive method of proactive deployment of a handover decision mechanism may be used to transfer the proactive decision mechanism either to any network node in the mobile communication environment or to the mobile device. Therefore, each such network node or the mobile device being adapted to execute the handover decision mechanism after proactive deployment thereof will be generally referred to as handover assisting apparatus in the following.

Figure 4:
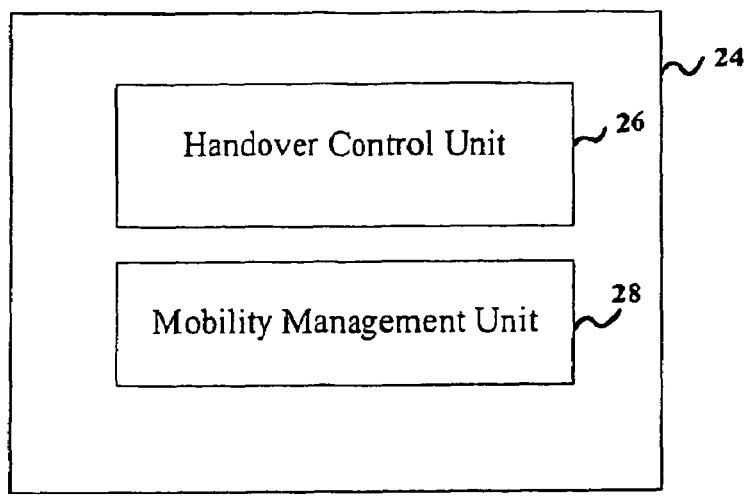
FIG. 4 shows a schematic diagram of a handover assisting apparatus according to the present invention.

FIG. 4 shows a schematic diagram of a handover assisting apparatus according to the present invention.

As shown in FIG. 4, the handover assisting apparatus 24 comprises into a handover control unit 26 and a mobility management unit 28.

Generally, the handover control unit 26 is adapted to arrive at a handover decision for a mobile device, while the mobility management unit 28 is adapted to implement the handover decision through signalling in the mobile communication environment and adequate update of communication links on the physical layer.

Figure 5:
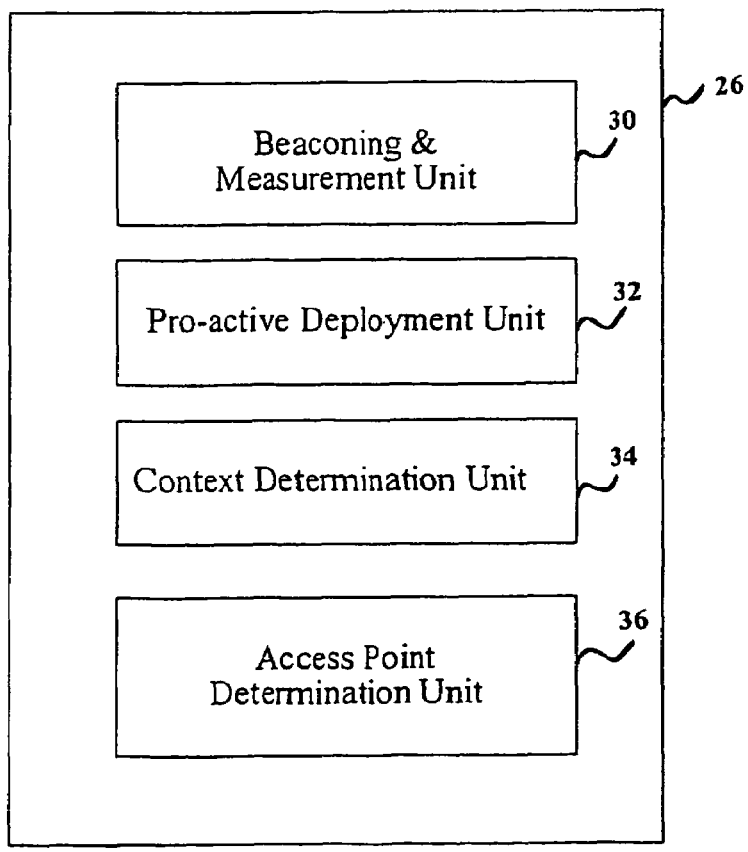
FIG. 5 shows a schematic diagram with the handover control unit shown in FIG. 4.

FIG. 5 shows a more detailed schematic diagram of the handover control unit shown in FIG. 4.

As shown in FIG. 5, the handover control unit 26 comprises a beaconing and measurement unit 30, a proactive deployment unit 32, and an access point determination unit 34.

Figure 6:
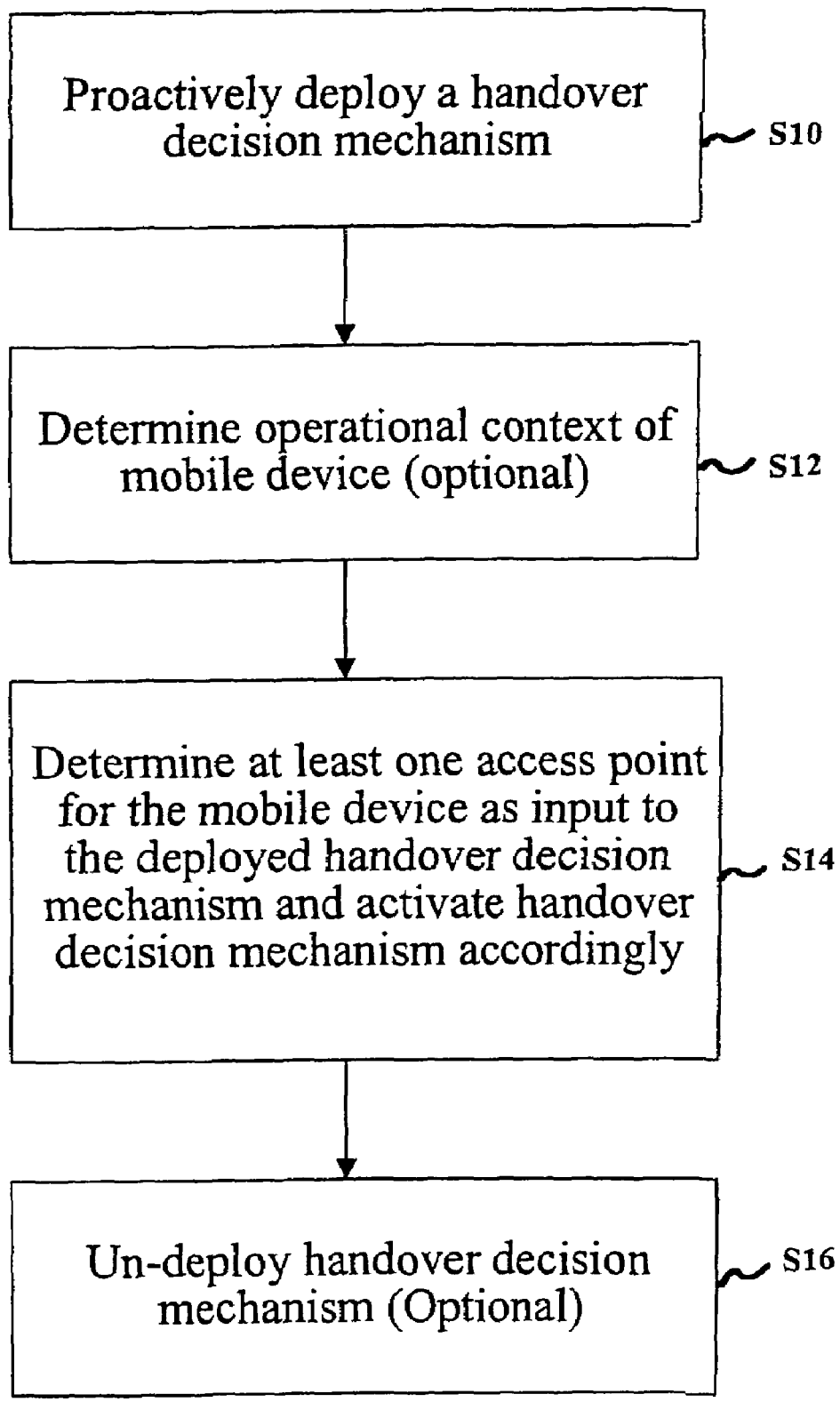
FIG. 6 shows a flowchart of the operation executed by the handover assisting apparatus shown in FIGS. 4 and 5.

FIG. 6 shows the basic flow of operation in the handover control unit 26 shown in FIGS. 4 and 5, illustrating the operation of related sub-units comprised therein.

As shown in FIG. 6, a prerequisite to achieve optimal handover decision mechanisms in the sense of the present invention is a proactive deployment of the handover decision mechanism in step S10 through the proactive deployment unit 32. Generally, before proactive deployment the handover decision mechanism is set up according to context information which is available at the time of deployment. Details of the proactive deployment will be explained in the following with reference to FIGS. 7 to 9.

Depending on the kind of handover decision mechanism, the context determination unit 34 is activated according to step S12 shown in FIG. 6 to determine the operational context of the mobile device. It should be noted that the activation of the context determination unit 34 is optional in the sense that the type of handover mechanism proactively deployed can also be of a type, e.g., relying solely on the determination of signal strength in the beaconing and measurement unit 30 making the determination of the operational context obsolete. It should be noted that also this case is covered by the present invention.

As shown in FIG. 6, a next step S14 is the activation of the access point determination unit 36 to determine at least one access for the mobile device as input to the proactively deployed handover decision mechanism. Details of this determination will be explained in the following with reference to FIG. 12.

As also shown in FIG. 6, finally the proactive deployment unit 32 executes a step S16 to un-deploy the handover decision mechanism when it is no longer relevant after executing the handover. It should be noted that this step S16 is optional, e.g., when a subsequent proactive deployment of a handover decision mechanism is achieved by overwriting previously deployed handover decision mechanisms.

In the following, further details of proactive deployment of a handover decision mechanism will be explained with reference to FIGS. 7 to 13.

Figure 7:
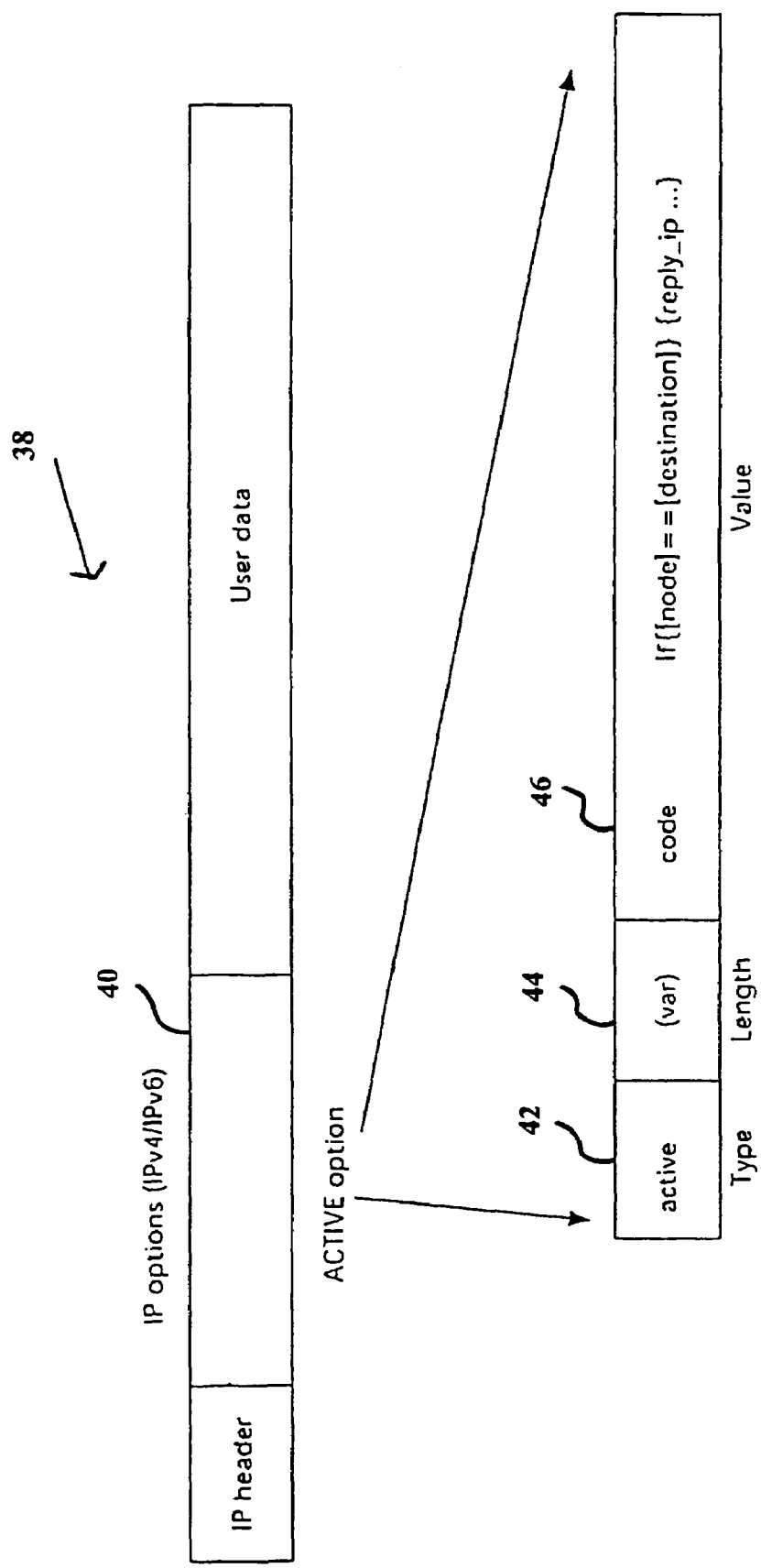
FIG. 7 shows the proactive deployment of a handover decision mechanism through transfer of code data.

FIG. 7 shows a first option for proactive deployment of a decision mechanism through download of code data either to the mobile device or to a network node in the mobile communication environment, e.g., one or more candidate access points.

As shown in FIG. 7, one approach is to use IPv4/IPv6 with an extension to IP option mechanisms that support the embedding of program fragments into IP packets as they traverse the mobile communication environment.

As shown in FIG. 7, data packets 38 are extended by active options 40 that allow to integrate code data which is executed after proactive deployment.

In other words, the approach shown in FIG. 7 describes an "in-band" approach in the sense that data packets carry the code along with data which might be necessary to execute the code, e.g., being related to the operational context.

As also shown in FIG. 7, the active option 40 divides into the type of active options that may be used to classify the code data, further a length variable 44 defining the length of the payload data, and the code data 46.

It should be noted that the download of code data is particularly suited to concepts of active networks where network nodes can form computations on data flowing on them, e.g., the access points. It is possible to "program" the upper communication environment by proactively deploying handover decision mechanisms as code data to relevant locations within the mobile communication environment and/or the mobile device.

Further, it should be noted that there is not any particular restriction on the type of code data provided through the active option 40, so that any type of handover style is freely supportable within the framework of the present invention.

A further approach to proactive deployment of a handover decision mechanism being related to the transfer of a tabular data structure is shown in FIG. 8.

As shown in FIG. 8, proactive deployment of a handover mechanism may also be achieved through download of handover decision criteria, e.g., signal strength, bandwidth, and options for determination of the operational context of the mobile device in the form, e.g., of a table. Further download data is related to threshold values, e.g., a threshold TS for the signal strength and a threshold TB for the bandwidth.

A first option is that this tabular style handover decision mechanism data is proactively deployed to a pre-installed functionality either in the mobile device or one or more of the access nodes in the mobile communication environments which will then use the criteria listed in tabular-form for executing a handover decision.

Another option is that the tabular style dynamic handover decision criteria are proactively deployed together with a related functionality for processing the criteria, e.g., using the inventive concept illustrated with respect to FIG. 7. In this case, the payload data of the IP packet could carry the dynamic handover criteria while the active option carries the related code data for processing thereof.

As shown in FIG. 8, once the proactive deployment of the handover decision mechanism is achieved, it may then be applied to a set of candidate points AP1 to AP4. Here, it should be noted that the following explanations are given as examples only.

As shown in FIG. 8, for each of the candidate setpoint AP1 to AP4 the different criteria listed in the handover criteria table may be applied. The result may be, e.g., that a signal strength is exceeding the predefined threshold TS at access points AP1 and AP3, but not at access points AP2 and AP4. Further, a result of applying the handover decision mechanism may be that the available bandwidth is higher than a threshold TB at access points AP1 and AP3, but not at access points AP2 and AP4.

As shown in FIG. 8, a further criterion is related to movement prediction. Here, according to the present invention it is proposed to apply priorities for different access points of AP1 to AP4. In more detail, for each of the candidate access points AP1 it will be evaluated whether it is in compliance with the movement prediction along a movement route for the movement device.

For the particular example given in FIG. 8, it is assumed that the priority for access point AP1 and AP2, i.e., the value of P1 and P2, is low, and that further the priority P3 and P4 for the remaining access points AP3 and AP4 is high.

The result of execution of the proactively deployed handover decision mechanism according to FIG. 8 is shown in the last row of FIG. 8.

Access point AP1 is dropped, as it is not lying close enough to the predicted movement route of the mobile device indicated through a low value of priority. Access point AP2 is dropped, as either signal strength or bandwidth are high enough to achieve the desired quality of service. As a consequence, the access points AP1 and AP2 are not considered for handover and a possibly proactively deployed handover decision mechanism is un-deployed, which step, however, is optional.

As shown in FIG. 8, further candidates for handover are the access points AP3 and AP4. For the time being, access point AP4 will not be considered due to a low level of signal strength and restricted bandwidth. However, this access point AP4 has a higher priority value regarding the movement prediction or, in other words, there is a high probability that this access point may be an excellent candidate for handover during subsequent movement of the mobile device. It is for this reason that in anticipating the further movement of the mobile device, proactive deployment of the handover decision mechanism is initiated for this access point AP4.

As also shown in FIG. 8, for the four candidates finally handover is achieved to access point AP3, as here sufficient signal strength and bandwidth are available and also this access point is suited to the movement prediction indicated through a high value of priority.

A further modification of the proactive deployment approach shown in FIG. 8 is the processing of criteria.

While according to FIG. 8, in particular the processing of the signal strength and bandwidth leads to a dedicated yes/no decision, according to the present invention it is also possible to apply a weighting function to these criteria. In other words, it is not necessary to strictly decide in view of a predefined threshold value but any kind of weighting function is well applicable to the dynamic criteria according to the present invention.

Figure 9:
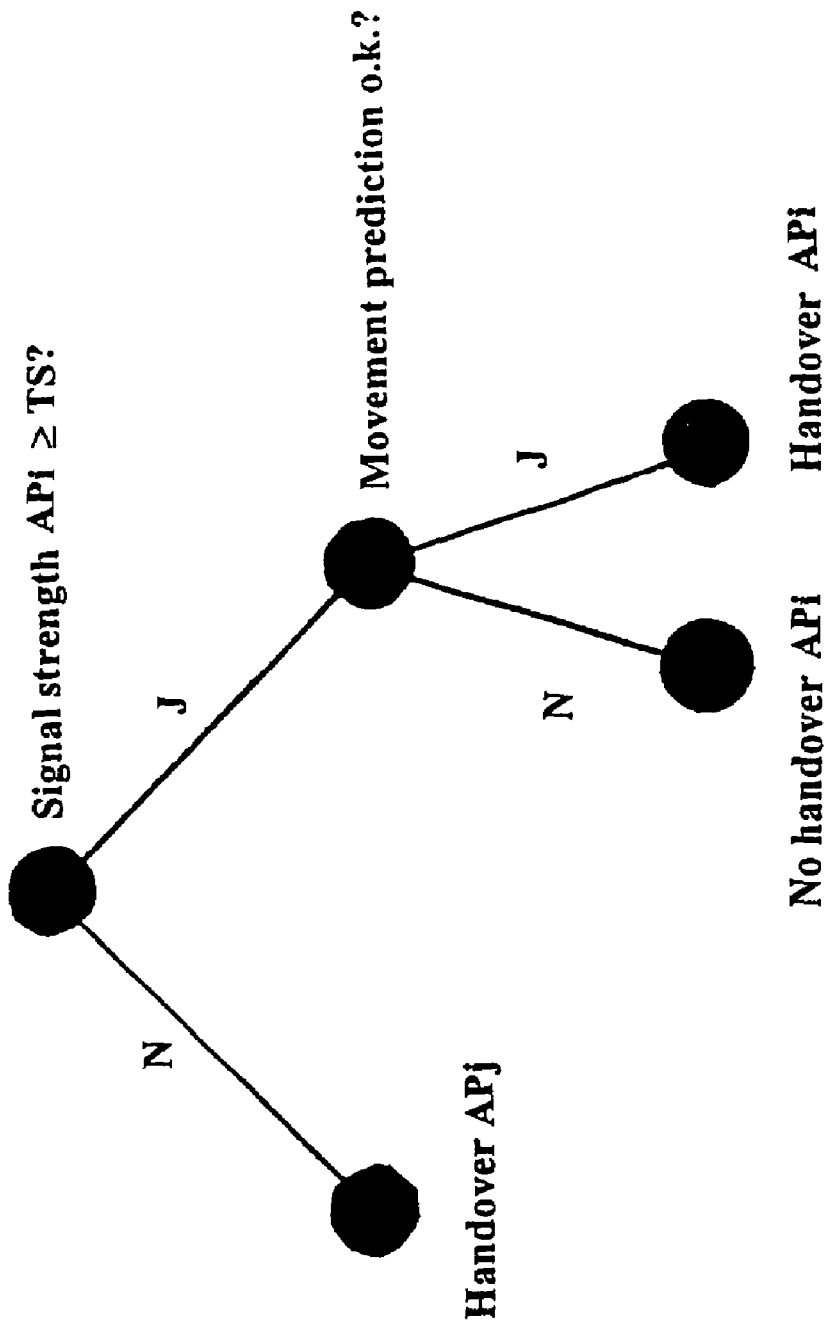
FIG. 9 shows the proactive deployment of a handover decision mechanism through transfer of decision criteria in the form of a decision tree.

FIG. 9 shows a further approach to proactive deployment of a handover decision mechanism according to the present invention relying on proactive deployment of a decision tree.

Using the approach shown in FIG. 9, a handover decision is executed through traversal of the decision tree from the route node to a leaf node. During this traversal, different criteria such as signal strength and compliance with a movement prediction are considered before a decision to handover to a specific point is taken or not, e.g., an access point APi. Otherwise, the decision may branch up to a route node for handover to an access point APj being different from the dropped access point APi.

While above different embodiments for proactive deployment of a handover decision mechanism and different types of handover decision mechanisms have been explained with respect to FIGS. 7 to 9, in the following different embodiments being related to the determination of operative context and access point determination will be explained with respect to FIGS. 10 to 12.

Figure 10:
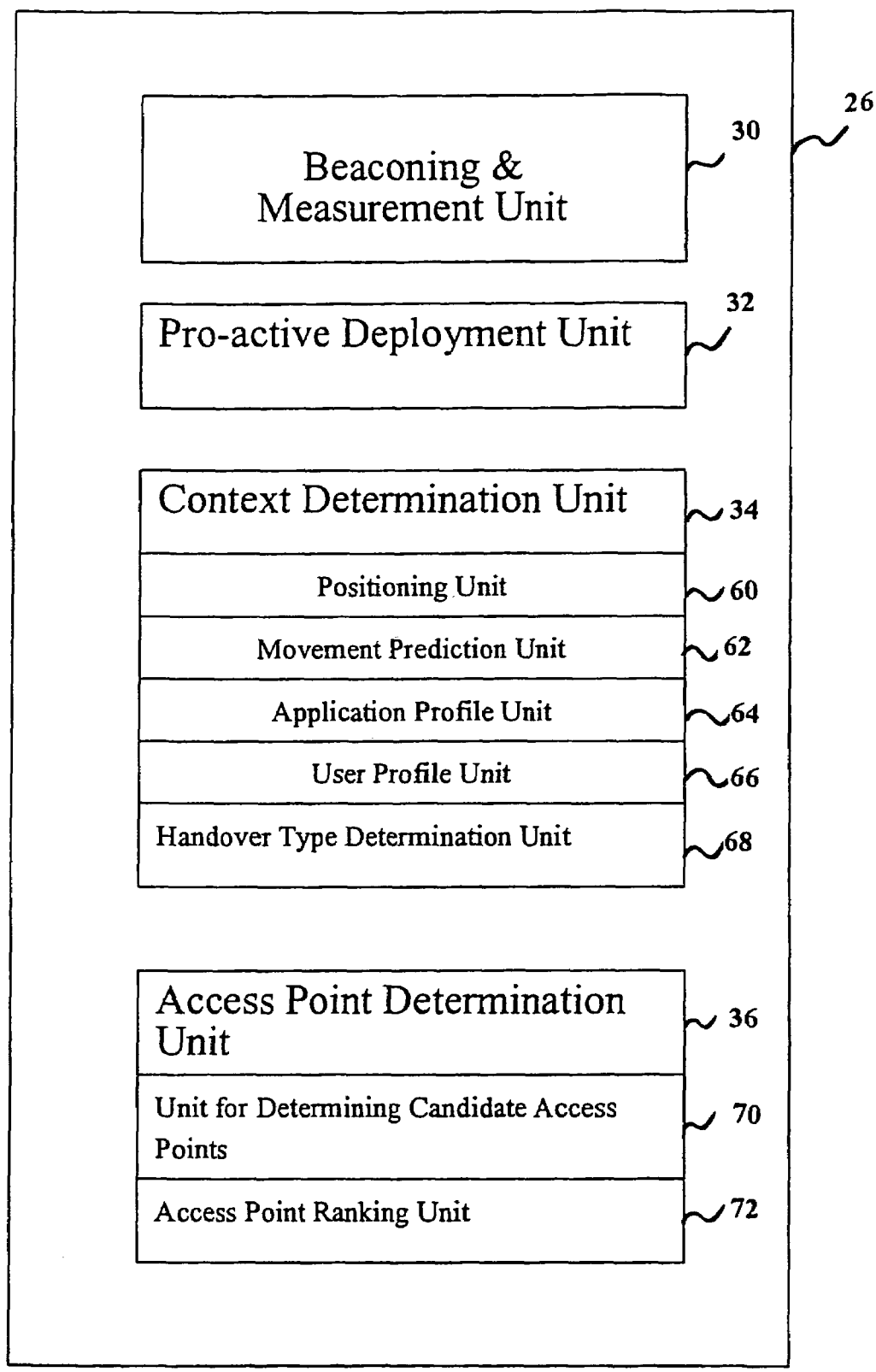
FIG. 10 shows a more detailed schematic diagram for the handover control unit shown in FIG. 5.

FIG. 10 shows a detailed schematic diagram of the handover control unit shown in FIGS. 4 and 5.

As shown in FIG. 10, the context determination unit 34 of the handover control unit 26 is provided to generate information regarding the operative context of the mobile device 10 and the mobile communication environment 14. In particular, the context determination unit 34 comprises a positioning unit 60, a movement prediction unit 62, an application profile unit 64, a user profile unit 66, and a handover type determination unit 68.

Operatively, the positioning unit 60 is adapted to determine the location of a mobile device in the mobile communication environment. The determination of the location may be achieved through use of information available in the mobile communication environment, e.g., using a cell ID of the cell where the mobile device is currently located. An alternative would be the use of global positioning systems, e.g., GPS, etc., which is of advantage for mobile devices connecting to both the mobile communication environment and to a satellite based positioning system.

Further, operatively the movement prediction unit 62 is adapted to predict a movement of the mobile device in the mobile communication environment, either on the basis of user profile information or on the basis of information that a mobile device is repeatedly following a specific route. Another option for the operation of the movement prediction unit 62 could be the exchange of data with a positioning system, e.g., GPS, for provision of routing information.

Further, operatively the application profile unit 64 is adapted to determine a profile of applications running on the mobile device, e.g., data services, speech services, voice services, video services, multimedia services in general, etc.

Further, operatively the user profile unit 66 is adapted to determine a profile of the user, e.g., a predefined movement patterns for the user, access rights to different services for the user, etc. This may be achieved either through local storage in the mobile device or through remote access to the mobile communication environment.

Further, operatively handover type determination unit 68 is related to the determination of a type of handover decision. It should be noted that the activation of the handover type determination unit 68 is optional. A first option for the type of handover is a mobile-assisted handover. Another option for the type of handover option is a network-assisted handover. A third option for the type of handover is a hybrid form of handover where part of the handover functionality is provided through network nodes, e.g., access nodes, and part of the functionality is residing in the mobile device. The hybrid handover is particularly suited for soft handover.

Further to the sub-units of the context determination unit 34 explained above, FIG. 10 also shows sub-components of the access point determination unit 36.

The context determination as explained above may be modified either through multiple activation of the context determination unit—i.e., at the time of proactive deployment and at the time of handover decision—or through provision of at least two such context determination units, one in the mobile device and the other in the mobile communication environment.

The first alternative has the advantage that already at the time of proactive deployment context information is generated and used to set up the handover decision mechanism.

The second alternative has the advantage that it supports generation of context information at the location where it is available.

It should be noted that of course multiple context generation over time or at different locations may be combined.

As shown in FIG. 10, the access point determination unit 36 comprises a unit for determination of candidate access points 70 and an access point ranking unit 72.

Operatively, the unit for determining candidate access points 70 determines at least one candidate access point, e.g., using existing methods for identifying new access points such as measurement of the signal strength and the beaconing and measurement unit 30.

Further, operatively the access point ranking unit 72 may be activated for achieving a ranking of the identified candidate access points. It is important to note that the present invention allows for use of dynamic criteria for such a ranking, e.g., signal strength, bandwidth, QoS, type of traffic, e.g., packet-switched or circuit-switched, power consumption, network load, etc.

In the following, reference will be made to FIG. 11 for explanation of the cooperation of the different sub-units in the context determination unit 34.

Figure 11:
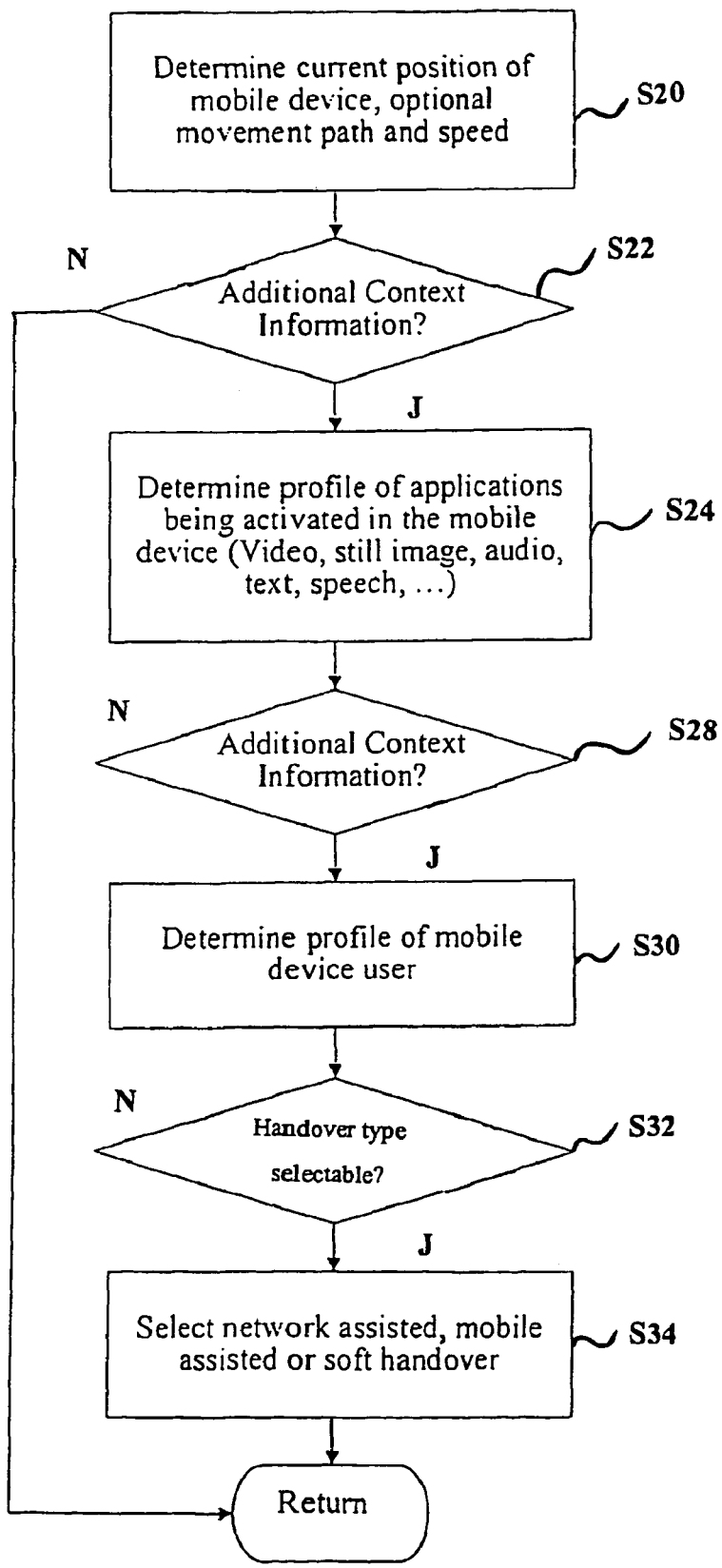
FIG. 11 shows a flowchart for determination of operation context-related information according to the present invention.

As shown in FIG. 11, initially the current position of the mobile device, optionally movement path and speed is determined in a step S20. Then follows an interrogation step S22 to determine whether additional context information is necessary. If this is not the case, the operation of the context determination unit stops. Otherwise, there follows a step S24 to determine a profile of applications being activated in the mobile device. Subsequent hereto, again an interrogation is carried out to determine whether additional context information is necessary in step S28. If this is not the case, the operation of the context determination unit 34 terminates. Otherwise, in step S30 the profile of the mobile device user is determined. Subsequent hereto, there follows an interrogation whether the type of handover is selectable in step S32. If this is not the case, the operation of the context determination unit 34 terminates while otherwise there is achieved a selection between network-assisted, mobile-assisted or soft handover in step S34.

The implication of the flowchart shown in FIG. 11 is that the different sub-units of the context determination unit 34 and related steps may be freely combined in dependence of the type and amount of context information necessary to optimize handover under the present invention.

Figure 12:
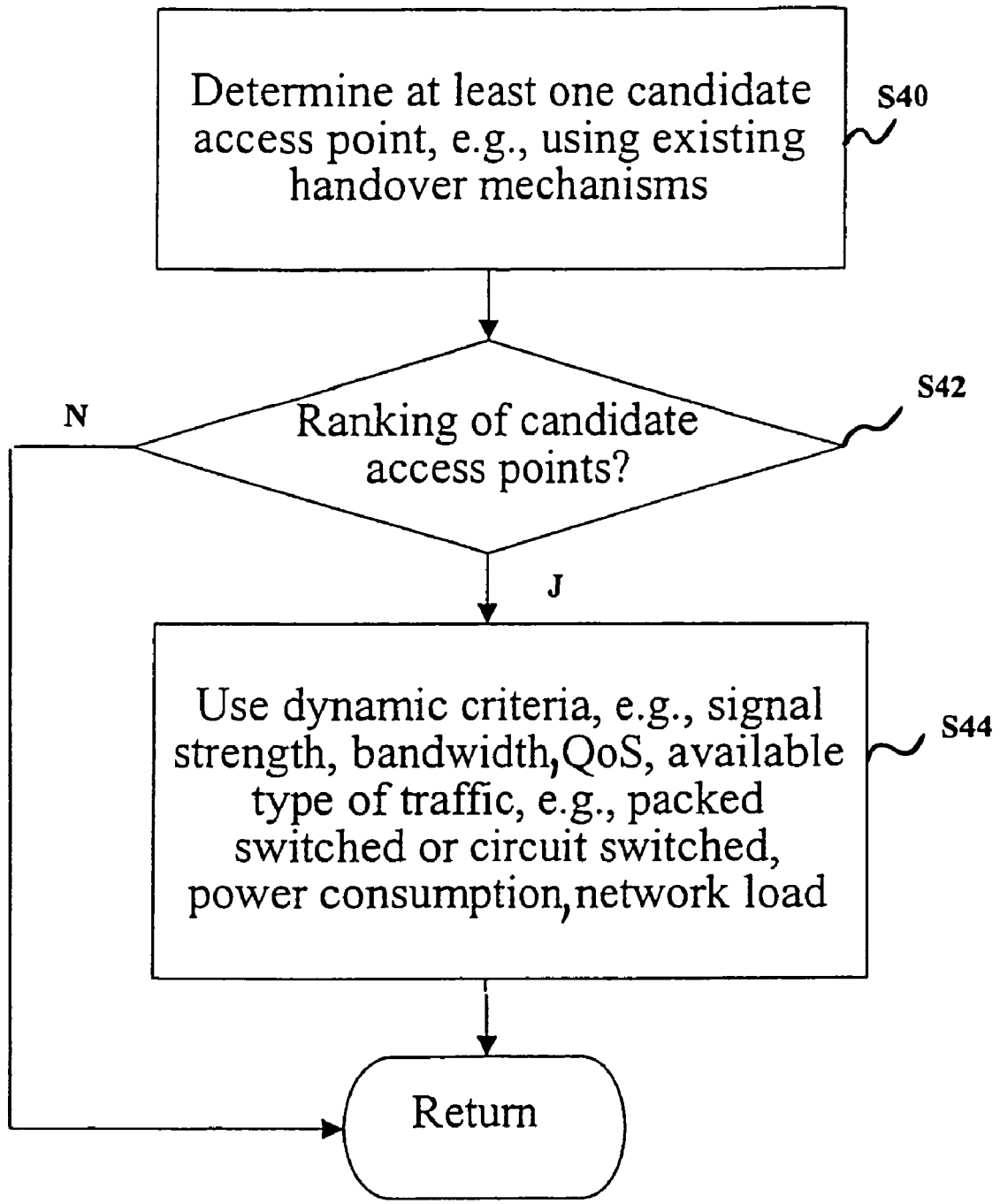
FIG. 12 shows a flowchart for deployment of a handover decision mechanism according to the present invention.

FIG. 12 shows a flowchart for the operation of the access point determination unit 36.

As shown in FIG. 12, initially there is determined at least one candidate access point, typically using existing handover mechanisms in step S40. Subsequent hereto, it is determined whether a ranking of candidate points is desired in step S42. If this is not the case, the operation of the access point determination unit 36 terminates. Otherwise, a ranking of candidate access points is achieved in step S44.

As already outlined above, an important of the present invention is the use of dynamic criteria for such a ranking, e.g., signal strength, bandwidth, QoS, available type of traffic such a packet-switched or circuit-switched traffic, power consumption, network load, etc. It should be noted that the type of dynamic criteria may change from handover to handover execution.

Once the operation context and the set of candidate access points has been determined as framework for deciding on handover, the next step is to actually achieve the handover which step is executed by the mobility management unit 28 shown in FIG. 4.

Figure 13:
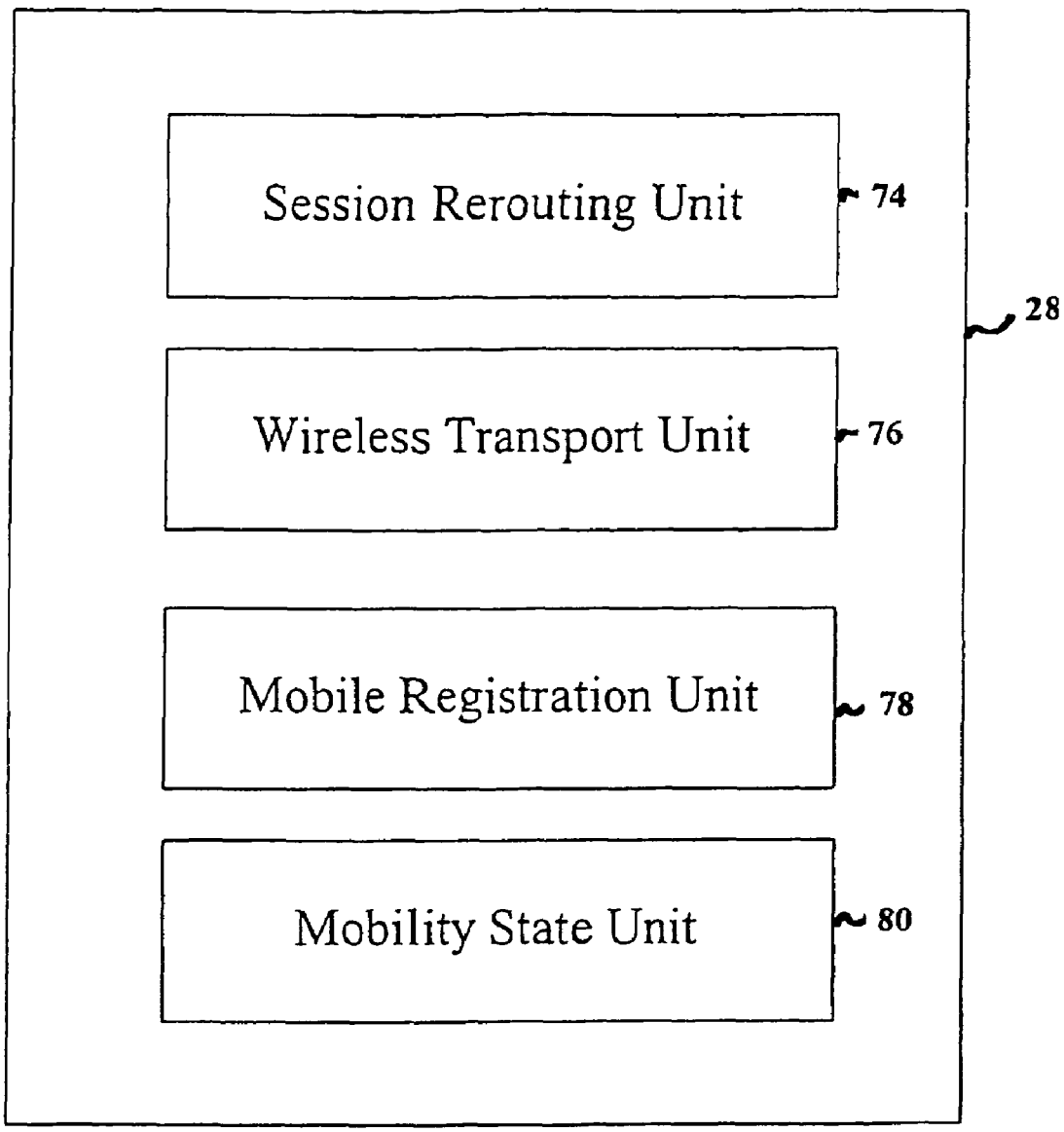
FIG. 13 shows a more detailed schematic diagram of the mobility management unit shown in FIG. 4.

FIG. 13 shows in more detail a schematic diagram of this mobility management unit 28.

As shown in FIG. 13, the mobility management unit 28 comprises a session re-routing unit 74, a wireless transport unit 76, a mobile registration unit 78, and a mobility state unit 80.

Operatively, the session re-routing unit 74 controls the data path in access networks in order to forward data to/from the mobile device through the new access point. The re-routing of sessions may include admission control and QoS adaptation for handling wireless bandwidth resources.

Further, operatively the wireless transport unit 76 achieves interaction with physical and data-linked layers in mobile devices and access points for transfer of active sessions between different wireless channels. Here, a channel change may be realized through a new time slot, frequency band, codeword or logical identifier, depending on the type of layer.

Further, operatively the mobile registration unit 78 is handling state information on the mobile device and exchanges this state information with the mobile communication network at execution of handover.

Further, operatively the mobility state unit 80 operatively maintains information regarding the collectivity of the mobile device, further addressing and routing information, bandwidth.

In the following, different application scenarios for the proactive deployment mechanism according to the present invention will be explained with respect to FIGS. 14 to 16.

Figure 14:
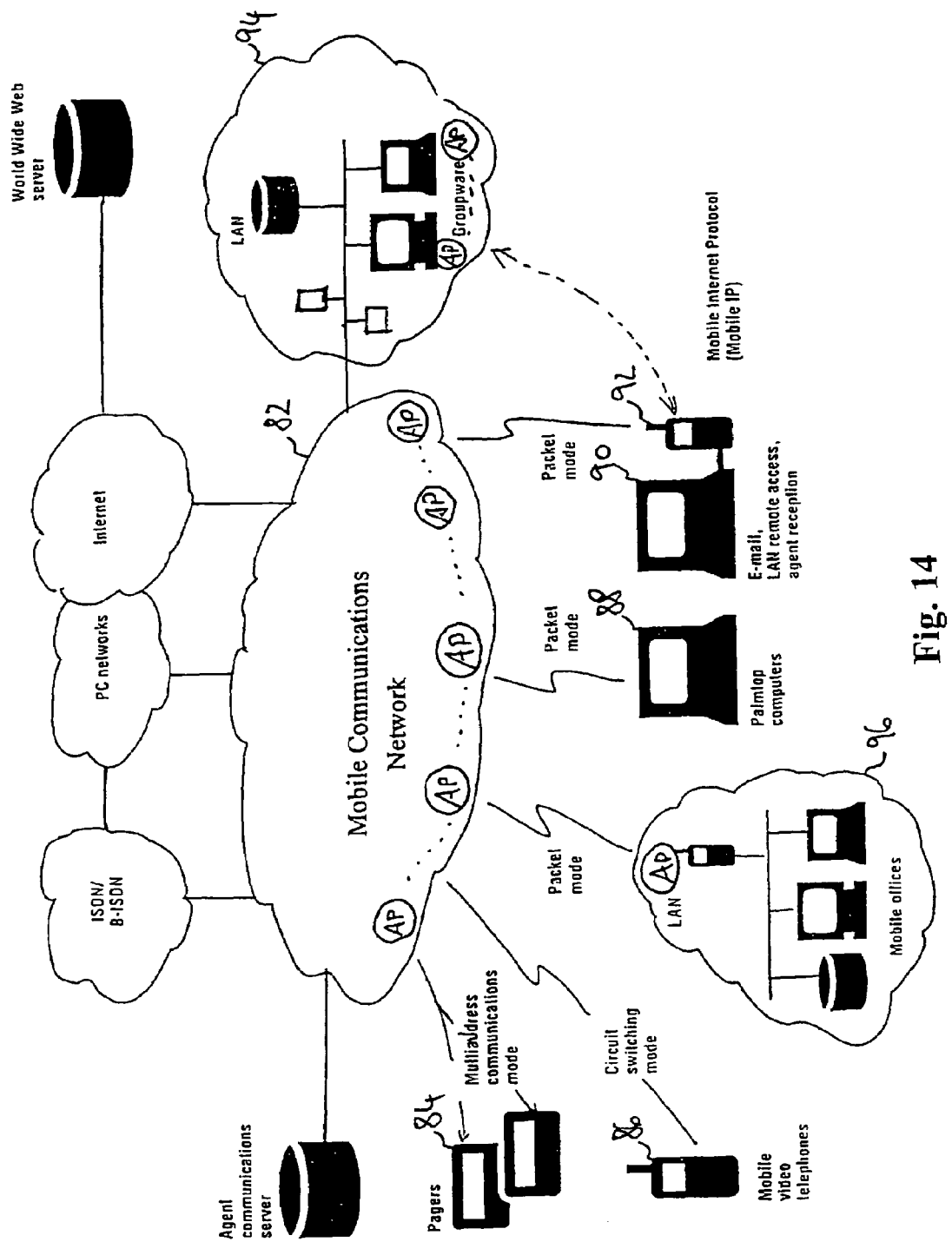
FIG. 14 shows a first example of applying the proactive deployment of a decision mechanism according to the present invention to a mobile communication environment.

FIG. 14 shows an application scenario being related to a mobile communication network 82 supporting both packet-switched and circuit-switched, connections to a plurality of mobile devices. Examples heretofore are a pager 84, a mobile video telephone 86, and portable palmtop computers 88 and 90.

As shown in FIG. 14, the way the palmtop computers are connected to the mobile communication network 82 may either be a direct packet-switched connection or through a mobile telephone 92. The mobile telephone achieves this connection through wireless communication either to the mobile communication network 82 or to a separate local area network LAN 94, e.g., using the mobile Internet protocol for wireless communication.

Yet another option shown in FIG. 14 is the support of mobile offices 96, which may be connected to the mobile communication network 82.

From the application scenario shown in FIG. 14 it becomes clear that the application of the inventive proactive deployment concept is not restricted to any type of mobile device or type of mobile communication environment as long as the proactive deployment mechanism is applied to the related access points in the various communication networks, i.e., the mobile communications network 82, the local area network LAN 94, or the local area network LAN 96.

Further, FIG. 14 shows that there is also no restriction on type on applications being supported. Therefore, proactive deployment of handover decisions may be achieved in relation to Internet services, PC network services, ISDN/BISDN services or agent communication services.

Figure 15:
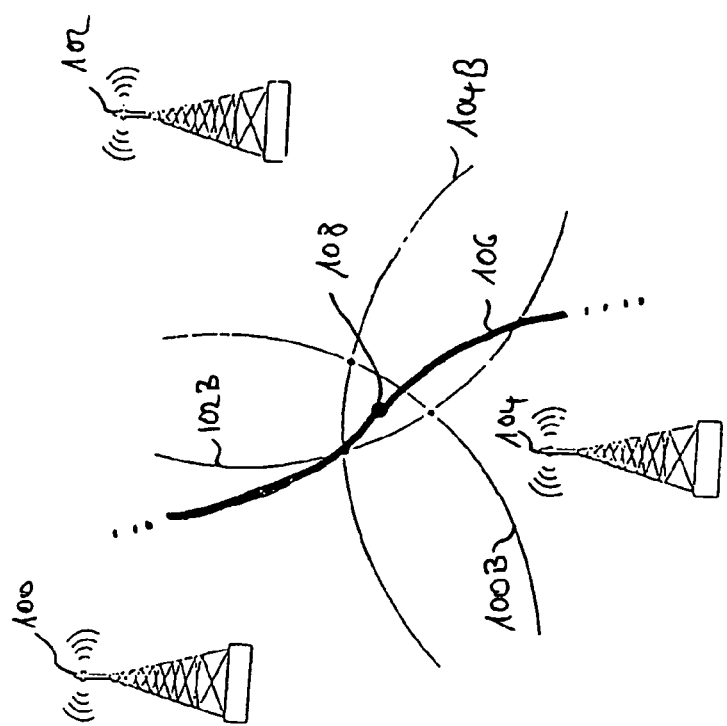
FIG. 15 shows a second example applying the proactive deployment of a decision mechanism according to the present invention to a mobile communication environment.
Figure 15:
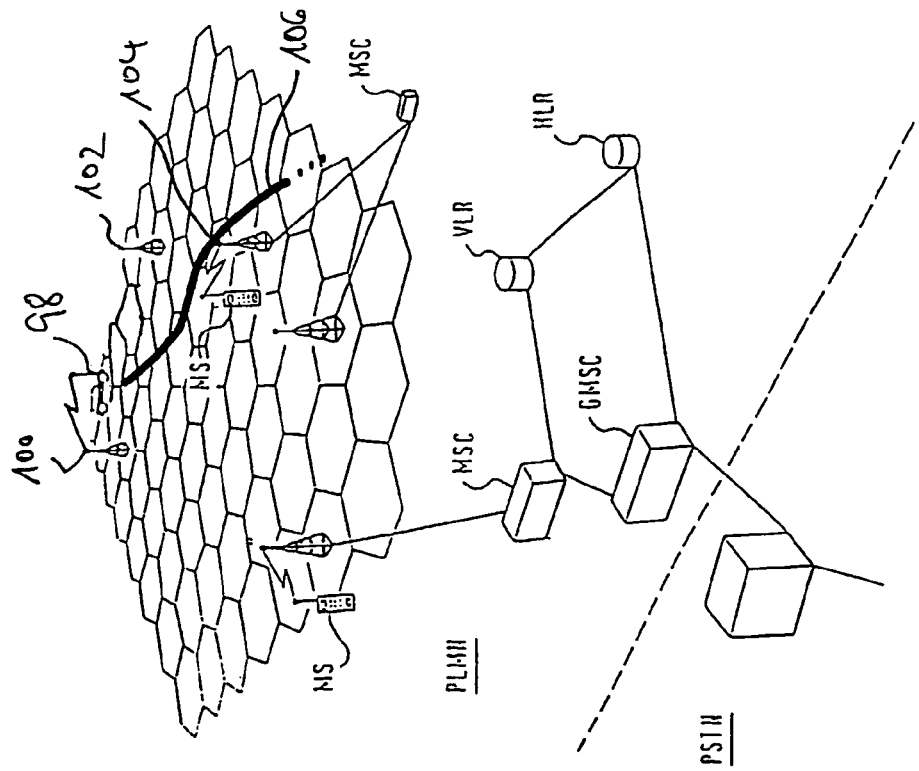

FIG. 15 shows a further application scenario being related to proactive deployment of handover decision mechanisms in cellular mobile communication networks.

As shown in FIG. 15, a further option for application of the inventive proactive deployment mechanism for a handover decision mechanism would be mobile communication from a vehicle, e.g., a car 98.

A typical scenario would be that the car moves in the coverage area of the mobile communication network between different base stations 100, 102, and 104 along a route 106.

The application of the inventive proactive deployment of a handover decision mechanism is of particular relevance when the car 98 is situated at a location 108 being covered by at least two base stations.

In other words, the borderlines 100B, 102B, and 104B of the coverage areas of the base stations 100, 102, and 104 form an intersection wherein the location 108 of the car 98 may be situated.

As outlined above, in such a situation the prediction of movement of the car 98 is of particular advantage considering the alternative of handover either to the base station 102 or 104. As the route 106 of the car 98 proceeds within the borderline 104B it is better to hand over to base station 104.

It should be noted that the proactivity of deployment of the handover decision mechanism allows to establish relevant mechanisms for taking the handover decisions at the right time. Therefore, assuming that the car 98 is moving with a certain speed, the speed-up through proactivity enables the appropriate handover decision.

Further, it should be noted that proactive deployment of the handover decision may be achieved either towards the mobile device in the car 98, or alternatively to a base station controller of the base stations 100, 102, 104.

Figure 16:
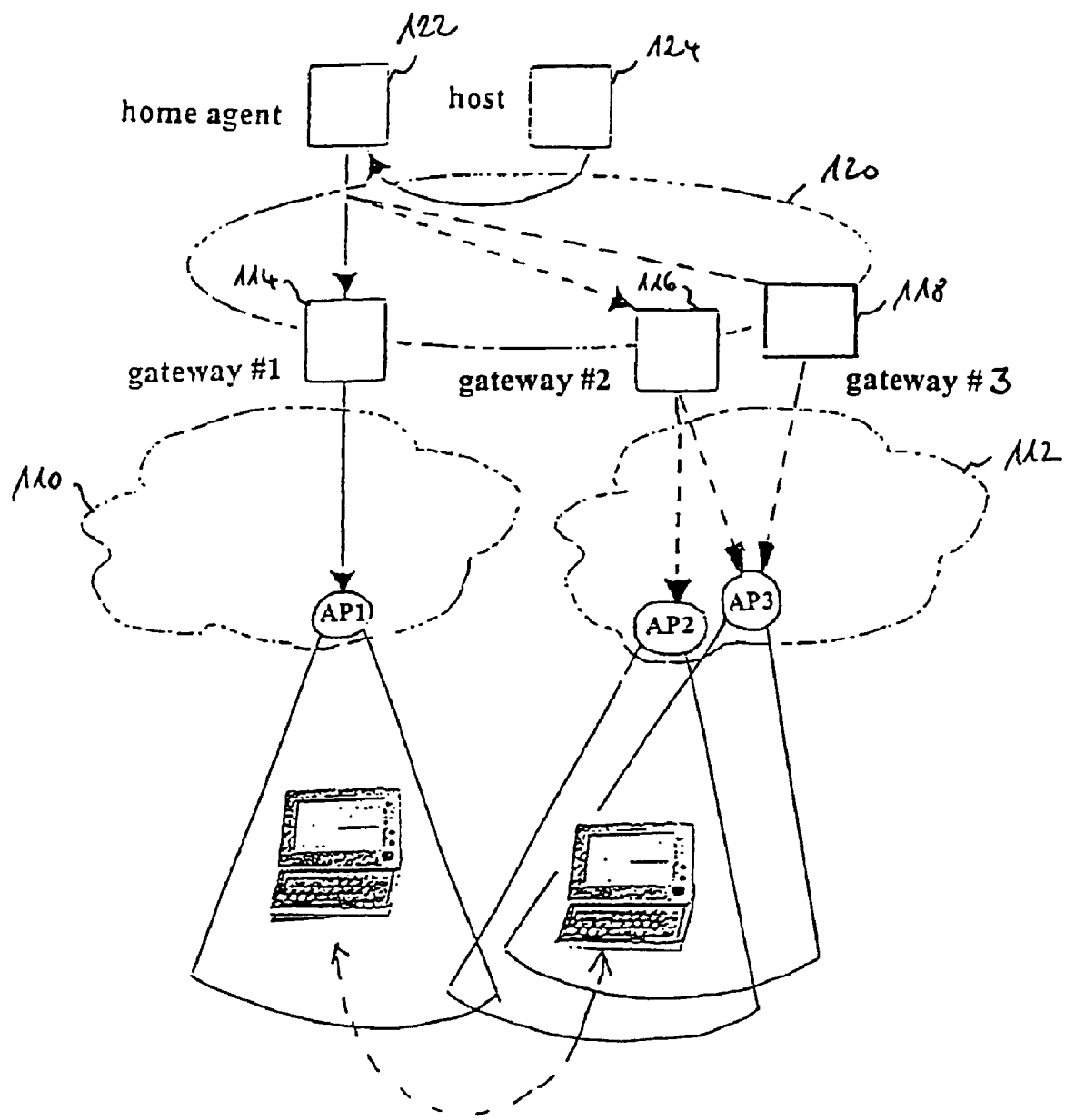
FIG. 16 shows a third example of applying the proactive deployment of a decision mechanism according to the present invention to a mobile communication environment.

FIG. 16 shows a further application scenario for the proactive deployment of the handover decision mechanism being related to a mobile IP communication environment.

As shown in FIG. 16, an example of such an IP-based mobile communication environment may be the provision of two cellular IP networks 110, 112 connected via gateways 114, 116 and 118 and a mobile IP enabled internetwork 120 to a home agent 122. The home agent 122 is provided to handle the IP address to the appropriate gateway for access to the mobile device through the host 124 supporting services running on the mobile device.

The application scenario shown in FIG. 16 shows that proactive deployment of the present invention is applicable not only to internal handovers within a single mobile communication environment but also to "access" handovers and related "entry" handovers between two such mobile communication environments 110 and 112 via the internetwork.

Further, proactive deployment according to the present invention is also applicable to intergateway handover decisions in the mobile IP enabled internetwork 120. In this case, a suitable network node for proactive deployment of the handover decision mechanism will be the home agent 122.

While above different features of the present invention have been explained with respect to specific embodiments, it should be clear that these features may be freely combined to achieve further modifications and variations of the present invention. Further, proactive deployment related functionality may either be realized in software, hardware, or a combination thereof. Therefore, the scope of invention is only determined by the appended claims.

The invention claimed is:

1. A method of assisting at least one handover for a mobile device in a mobile communication environment with a plurality of access points, characterized by the steps comprising:

determining an operational context as a profile of applications being executed in the mobile device before or at the time of pro-active deployment of a handover decision mechanism;

proactively deploying the handover decision mechanism in relation to the at least one handover and according to an operational context into a subsystem of the mobile communication environment executing the handover;

identifying at least one candidate access point as input to the proactively deployed handover decision mechanism using existing handover mechanisms; and determining at least one new access point for the mobile device from the at least one candidate access point using the deployed handover decision mechanism such that the at least one new access point supports the applications running on the mobile devices.

2. A method according to claim 1, characterized in that it further comprises the step to determine a current position of the mobile device as operational context.

3. Method according to claim 2, characterized in that it further comprises the step of predicting a movement of the mobile device as operational context.

4. A method according to claim 3, characterized in that the step of predicting a movement of the mobile device is related to a movement path of the mobile device.

5. A method according to claim 4, characterized in that the step of predicting a movement of the mobile device is further related to a movement speed of the mobile device.

6. A method according to claim 1, characterized in that the profile of applications is related to a group comprising video, still image, audio, text, and speech applications.

7. A method according to claim 1, characterized in that the profile of applications is related to a group comprising interactive, point-to-point, one-way and/or multipoint applications.

8. A method according to claim 1, characterized in that it further comprises the step of determining the operational context of the mobile device as a profile of at least one mobile device user.

9. A method according to claim 1, characterized in that candidate access points are ranked according to dynamic criteria.

10. A method according to claim 9, characterized in that criteria are selected from a group comprising signal strength, bandwidth, supported applications, quality of service, network usage, power consumption.

11. A method according to claim 1, characterized in that the handover decision mechanism is deployed into the access point of the mobile communication network.

12. A method according to claim 1, characterized in that the handover decision mechanism is deployed in the mobile device.

13. A method according to claim 1, characterized in that the handover decision mechanism is deployed in access point of the mobile communication environment and in the mobile device.

14. A method according to claim 1, characterized in that it further comprises the step of deploying the handover decision mechanism through transfer of code data achieving the determination of the at least one new access point for the mobile device.

15. A method according to claim 1, characterized in that it further comprises the step of deploying the handover decision mechanism through transfer of criteria for the at least one new access point.

16. A method according to claim 15, characterized in that criteria are described as data structure.

17. A method according to claim 1, characterized in that it further comprises the step of un-deploying the handover decision mechanism when it is no more relevant.

18. A method according to claim 1, characterized in that the mobile device is a mobile telephone, a personal digital agent, a portable computer or a hybrid.

19. A method according to claim 1, characterized in that handover is achieved according to a standard selected from a group comprising GSM, PDG, GPRS, PPP, HSGSD, WLAN, HiperLAN, IrDa, Bluetooth, IS 45, IS 95, MT 2000.

20. A handover assisting apparatus for a mobile device in a mobile communication environment with a plurality of access points, comprising:
    an application profile unit adapted to determine an operational context as a profile of applications being executed in the mobile device before or at the time of pro-active deployment of the handover decision mechanism;
    a pro-active deployment unit adapted to pro-actively deploying a handover decision mechanism in relation to the at least one handover and according to the operational context into a subsystem of the mobile communication environment executing the handover;
    a candidate access point determination unit adapted to identify at least one access point using existing handover mechanisms; and
    an access point determination unit adapted to determine at least one new access point for the mobile device from the at least one candidate access point using the deployed handover decision mechanism, such that the at least one new access point supports the application running of the mobile device.

21. A handover assisting apparatus according to claim 20, characterized in that a context determination unit comprises a position unit adapted to determine a current position of the mobile device as operational context.

22. A handover assisting unit according to claim 20, characterized in that a context determination unit further comprises a movement prediction unit adapted to predict a movement of the mobile device as operational context.

23. A handover assisting unit according to claim 22, characterized in that the movement prediction unit is adapted to predict a movement of the mobile device according to a movement path.

24. A handover assisting unit according to claim 22, characterized in that the movement prediction unit is adapted to predict a movement of the mobile device according to a movement speed.

25. A handover assisting unit according to claim 20, characterized in that the application profile unit is adapted to determine the profile of applications in relation to a group comprising video, still image, audio, text, and speech applications.

26. A handover assisting unit according to claim 20, characterized in that the application profile unit is adapted to determine the profile of applications in relation to a group comprising a group comprising interactive, point-to-point, one-way and/or multipoint applications.

27. A handover assisting unit according to claim 20, characterized in that the context determination unit further comprises an user profile unit adapted to determine the operational context of the mobile device as a profile of at least one mobile device user.

28. A handover assisting apparatus according to claim 20, characterized in that the candidate access point determination unit is adapted to rank candidate access points according to dynamic criteria.

29. A handover assisting apparatus according to claim 28, characterized in that the candidate access point determination unit is adapted to rank candidate access points according to dynamic criteria selected from a group comprising signal strength, bandwidth, supported applications, quality of service, network usage, power consumption.

30. A handover assisting apparatus according to claim 20, characterized in that the context determination unit further comprises a handover type determination unit adapted to select a handover type.

31. A handover assisting apparatus according to claim 30, characterized in that the handover type determination unit is adapted to select a network assisted hand over.

32. A handover assisting apparatus according to claim 30, characterized in that the handover type determination unit is adapted to select a mobile device assisted hand over.

33. A handover assisting apparatus according to claim 30, characterized in that the handover type determination unit is adapted to select a combined network assisted and mobile device assisted hand over.

34. A handover assisting apparatus according to claim 20, characterized in that the proactive deployment unit is adapted to deploy the handover decision mechanism through transfer of code data achieving the determination of the at least one new access point for the mobile device.

35. A handover assisting apparatus according to claim 20, characterized in that the proactive deployment unit is adapted to deploy the handover decision mechanism through transfer of criteria for the at least one new access point.

36. A handover assisting apparatus according to claim 35, characterized in that the proactive deployment unit is adapted to transfer criteria according to a data structure.

37. A handover assisting apparatus according to claim 20, characterized in that the proactive deployment unit is adapted to un-deploy the handover decision mechanism when it is no more relevant.

38. A handover assisting apparatus according to claim 20, characterized in that handover is assisted according to a standard selected from a group comprising GSM, PDG, GPRS, PPP, HSGSD, WLAN, HiperLAN, IrDa, Bluetooth, IS 45, IS 95, MT 2000.

* * * * *